United States Patent [19]

Weiss et al.

[11] Patent Number: 4,772,477

[45] Date of Patent: Sep. 20, 1988

[54] MEAT ACIDULANT

[75] Inventors: Herbert D. Weiss, Suffern, N.Y.; Robert G. Reynolds, Harrington Park, N.J.

[73] Assignee: Balchem Corporation, Slate Hill, N.Y.

[21] Appl. No.: 920,185

[22] Filed: Oct. 17, 1986

[51] Int. Cl.$^4$ .................. A23L 1/221; A23L 1/317
[52] U.S. Cl. .................................. 426/99; 426/646; 426/650; 426/652
[58] Field of Search ............ 426/99, 646, 650, 652, 92

[56] References Cited

U.S. PATENT DOCUMENTS

| | | |
|---|---|---|
| 2,648,609 | 8/1953 | Wurster . |
| 2,799,241 | 7/1957 | Wurster . |
| 3,015,128 | 1/1962 | Somerville, Jr. . |
| 3,110,626 | 11/1963 | Larson et al. . |
| 3,159,874 | 12/1964 | Langer et al. . |
| 3,247,065 | 4/1966 | Koff . |
| 3,279,994 | 10/1966 | Koff . |
| 3,293,132 | 12/1986 | Stoyle et al. . |
| 3,341,466 | 9/1967 | Brynko et al. . |
| 3,682,887 | 8/1972 | Yoshioka et al. . |
| 3,819,838 | 6/1974 | Smith et al. . |
| 4,068,006 | 1/1978 | Moritz ............... 426/650 X |
| 4,497,845 | 2/1985 | Percel et al. ............ 426/646 |
| 4,511,584 | 4/1985 | Percel et al. ............ 426/99 |
| 4,511,592 | 4/1985 | Percel et al. ............ 426/646 |
| 4,537,784 | 8/1985 | Percel et al. ............ 426/303 |

OTHER PUBLICATIONS

Avicel Application Bulletin, No. PH-11, Durkee Industrial Foods, p. 5.
Eastmann Products Publication No. ZM-80F, Eastman Kodak, pp. 6-7.

Primary Examiner—Arthur L. Corbin
Attorney, Agent, or Firm—Banner, Birch, McKie & Beckett

[57] ABSTRACT

The present invention provides an acidulant and a method of acidulating moist meat and meat emulsions at meat processing temperatures in the range of about 32° F. to 135° F. The method comprises mixing a coated acidulant into the meat or meat emulsion, the acidulant having a coating effectively encapsulating the acidulant. The coating comprises a mixture of about 50–70 wt. % of a water-soluble glyceride and about 30–50 wt. % of a hydrogenated vegetable oil.

14 Claims, No Drawings

MEAT ACIDULANT

BACKGROUND OF THE INVENTION

1. Field of the Invention

The present invention relates to the acidulation of meat and other food products and particularly to a method of acidulating, and a coated acidulant, effective in low temperature food processing.

2. Description of the Prior Art

The acidulation of meat products, particularly meat emulsions, is well known. Meat emulsions, for instance sausage emulsions, are mixtures of lean meat or meat protein and water forming a matrix in which fat particles, salt, sugar and curing agents are dispersed. It is also well known that meat emulsions will set up and harden as the pH of the emulsion decreases. Therefore, in order to assure easy processability, it is necessary to avoid lowering the pH of the emulsion during the early stages of preparation and processing. For instance, meat emulsions begin to harden at pHs below about 5.2 and especially at pHs below about 5.0, making it impossible to stuff the meat into casings for the production of sausages and like products. Generally, the emulsions remain processable at pHs above about 5.2. However, it is desirable to lower the pH of the final product below this level in order to enhance flavor and appearance (i.e. color), achieve a more solid texture and lengthen storage life.

Acidulation of food in the past has been accomplished by various means. One method comprises inoculating the food mass with a small amount of previously fermented food. The resulting inoculated food mass was then allowed to ferment for an extended period of time. Fermentation using this method was very slow due to the time required for bacteria to grow and produce acids (usually lactic acid) which eventually lowered the food pH to the desired level.

Another method of acidulating food comprises adding acid directly to the food. In meat emulsions and like products, especially ground meat products, localized high concentrations of acid (so-called "hot spots") must be avoided since they can degrade the appearance and taste of the finished food product. In order to avoid this problem, the acid must be quickly dispersed throughout the food mass. This requires special mixing apparatus able to operate under extremely stringent parameters. Even in cases where the added acid could be quickly and effectively dispersed, there remained the problem of substantially instantaneous set-up (hardening) of the food, before the final food processing steps could be completed.

One solution to the fast set-up problem was to add glucono delta lactone, rather than an acid, directly to the food. Glucono delta lactone reacts with water present in the food and hydrolyzes into gluconic acid. In practice, it was discovered that the acid-producing glucono delta lactone had a tendency to prematurely hydrolyze, and accordingly, had to be quickly dispersed throughout the emulsion. Due to the difficulty in controlling the rate and extent of hydrolysis, glucono delta lactone has only received limited acceptance as a food acidulant.

Another approach has been to coat solid granular acids with either a wax, a monoglyceride or a vegetable oil. When meats containing these coated granular acids are subjected to higher temperatures, such as in a smokehouse, the coatings melt thereby releasing the acid. For example, U.S. Pat. Nos. 4,537,784 and 4,511,584 both disclose lipid coatings for micro-encapsulated solid granular acids useful in food processing at temperatures in the range of 100°–150° F. The coatings are primarily triglycerides, but may also contain mono- and diglycerides. These patents further disclose that when the temperature of the food containing the coated acidulant is raised above the melting point of the triglyceride coating, the coating melts thereby releasing the acid. One problem with this procedure is that not all foods are processed at temperatures above 100° F. For instance, summer sausage, Genoa salami, and some German sausages are subject to maximum (i.e, smokehouse) temperatures of only 75°–80° F., which is below the melting point temperature of these types of acidulant coatings. Although acidulant coatings having a melting point in the range of about 75°–80° F. are known, acidulants having these coatings must be refrigerated until immediately before use, otherwise there is the danger of premature melting during shipment and handling.

U.S. Pat. No. 4,511,592 discloses an acidulant coating which does not depend upon melting the coating in order to release the acidulant. The coating material disclosed in this patent comprises an edible hydrolized starch and a protein. Once this coating comes in contact with water contained in the meat emulsion, the coating quickly dissolves thereby releasing the acid. In practice, it was discovered that the coatings disclosed in U.S. Pat. No. 4,511,592 are so water soluble that very little acid release delay is provided. For instance, in cases where the coating is extremely thick, (i.e., in cases where the coating comprises about 50 wt. % of the coated acidulant) the coating typically dissolves and releases the acid in a matter of minutes. In industrial processes, this is insufficient time in order to complete the processing of the meat emulsion, i.e. to stuff it into casings in the case of sausage production.

Thus, there has been a need in the art for an acidulant and a method of acidulating meat emulsions and other food materials which are subject to lower processing and smoking temperatures and yet which still provides adequate time delays, on the order of at least one and preferable at least two hours, before enough of the acidulant is released to lower the pH to a level where the food material sets up.

SUMMARY OF THE INVENTION

The present invention provides both a coated acidulant and a method of delayedly acidulating moist food and food emulsions at food processing temperatures in the range of about 32° F. to 135° F. The method comprises mixing a coated acidulant into the food or food emulsion, the acidulant having a coated effectively encapsulating the acidulant. The coating comprises a mixture of about 50–70 wt. % of a water-soluble glyceride and about 30–50 wt. % percent of a hydrogenated vegetable oil. Once the coated acidulant has been completely mixed into the food emulsion, water-contained in the food, after a suitable delay period, dissolves the water soluble glyceride component of the coating thereby destroying the coating and releasing the acidulant into the food. Coatings of this type typically provide a minimum delay period, between the time of first introducing the coated acidulant into the food and the time when a substantial pH drop in the food occurs, on the order of at least one hour. In preferred embodiments of the present invention, the delay period is at least about two hours.

DETAILED DESCRIPTION OF THE INVENTION

The present invention can be practiced with a number of food products in which acidulants are added in either a preservation or texturizing amount. The present invention has particular usefulness in the processing of certain meat products which are processed at temperatures below about 135° F. and particularly below about 100° F. Because of the absence of high temperatures during meat processing and smoking, conventional fat encapsulated acidulants cannot be employed since the fat coating does not melt at such low processing temperatures. The present invention provides advantages over acidulants having low temperature (i.e., 75°–80° F.) melting points, since the acidulants of the present invention don't need to be refrigerated before use. In the present invention, a portion of the coatings are water soluble and hence the moisture contained in the meat destroys the coating thereby causing acid release.

One example of a meat product which may be acidulated according to the present invention is winter sausage. Another example is a fermented sausage commonly known as summer sausage. Other types of fermented sausages which may be acidulated according to the methods of the present invention include Lebanon bologna, pepperoni, pork roll and cervelats (Farmer, Holsteiner, and Thuringer). Other emulsion-type sausages with which the present invention is useful include frankfurters, bologna, and dry sausages such as salami. Other meat products such as chopped meatloaf and potted comminuted meats can also be acidulated in accordance with the present invention.

Food grade acids useful in practicing the present invention include water soluble acids and other agents suitable for lowering the pH of moist food products, normally in solid or crystalline form. Examples include citric acid, ascorbic acid, tartaric acid, fumaric acid, adipic acid and glucono delta lactone which hydrolyzes into gluconic acid. In addition, food grade liquid acids applied to a suitable solid granular carrier may also be used. One example of such a liquid acid and carrier includes lactic acid on either calcium lactate, as described in U.S. Pat. No. 4,537,784, or on microcrystalline cellulose gels such as those sold by FMC Corporation, Philadelphia, PA., under the trademark AVICELL TM PH-101.

The term "acidulant" as used herein denotes both solid food grade acids as well as liquid food grade acids applied to a solid granular carrier. The term also encompasses compounds which react with water in the food to form acids, such as glucono delta lactone.

The acidulant coatings employed in the present invention comprise mixtures of about 50–70 wt. % of one or more water soluble glycerides and about 30–50 wt. % of one or more hydrogenated vegetable oils. Preferably, the mixture comprises about 60 wt. % percent of one or more water soluble glycerides and about 40 wt. % of one or more hydrogenated vegetable oils.

Useful water soluble glycerides include oxidatively stable mono- and diglycerides having film-forming properties and oxygen and moisture barrier properties. Preferably these glycerides are of edible quality for culinary purposes. Examples of suitable water soluble edible glycerides include distilled acetylated monoglycerides sold by Eastman Chemical Products, Inc., Kingsport, TN, under the trademark MYVACET TM; and mono- and diglyceride mixtures sold by Durkee Industrial Foods division of SCM Corporation, New York, NY, under the trade names DUR-EM TM and DURO-LO TM. In addition, mixtures of distilled monoglycerides and hydrogenated vegetable oils sold by Eastman Chemical Products, Inc., under the trademark MYVATEX TM may also be used as long as the glyceride/hydrogenated vegetable oil contents are within the above-mentioned ranges. A particularly preferred water soluble glyceride in the DUR-EM TM 207E product, a mixture of mono- and diglycerides containing at least 50% monoglycerides having a maximum iodine value (IV) of 5 (centigrams/gram of fat) and a capillary melting point in the range of 140°–146° F.

Suitable hydrogenated vegetable oils include triglycerides such as hydrogenated cottonseed, corn, peanut, soybean, palm, palm kernel, babassu, sunflower and safflower oils. Preferred hydrogenated vegetable oils include hydrogenated palm oil, cottonseed oil and soybean oil sold by Durkee Industrial Foods division of SCM Corporation under the trademarks DUR-KEE TM 07, 17, 27; DURATEX TM, KAORICH TM, KLX TM and ARATEX TM. A particularly preferred hydrogenated vegetable oil is the DURKEE TM 27 product, a hydrogenated palm oil, marketed in bead form and having a melting point in the range of about 136°–144° F.

The method of applying the coating to the acidulant is not critical, forms no part of the present invention and may be performed in any number of known manners. For instance, the acidulant particles may be suspended in the liquid coating and the suspension sprayed into a "freezing chamber". Alternatively, the particles may be sprayed with the coatings of the present invention, the particles being suspended by a flow of air (fluidized bed). U.S. Pat. Nos. 4,511,584 at columns 3–5 and 4,511,592 at column 4, the disclosures of which are incorporated herein by reference, teach preferred methods of applying fat coatings to granular acidulants. U.S. Pat. Nos. 4,537,784 at columns 3–4; 4,497,845 at column 4; 3,819,838; 3,341,466; 3,279,994; 3,159,874; 3,110,626; 3,015,128; 2,799,241; and 2,648,609, whose disclosures are all incorporated herein by reference, teach additional methods and apparatus for applying coatings which may be used to produce the coated acidulants used in the present invention.

In order to provide adequate time delays between the time when the coated acidulant is first introduced into the moist food product and the time when substantial acid leach begins to occur, it is important that the coatings effectively cover the acidulant surface. By the term "delayed release coating" it is meant that the coating is sufficiently thick and sufficiently continuous to ensure that the pH of the moist food product does not drop below about 5.0 within the first hour, and preferably within the first two hours. Typically, the coated acidulant will have a particle size distribution substantially within the range of 10–80 screen mesh. For these size particles, the coating typically comprises from about 20 to about 50 weight percent of the coated acidulant.

Although certain embodiments of the invention have been selected for description in the Examples hereinafter, it will be appreciated by those skilled in the art that these examples are merely illustrative of, but do not in any way limit the scope of the present invention which is defined in the appended claims.

EXAMPLES 1 AND 2

A thirty-pound batch of sausage was prepared using a genoa-type salami formula. The sausage was divided into two, fifteen-pound batches for subsequent addition of encapsulated citric acid at 0.666 wt. % and 1.0 wt. % levels. The citric acid coating was comprised of 40 wt. % hydrogenated palm oil and 60 wt. % DUR-EM TM 207E. The compositions of the two batches were as follows (all percentages are percent by weight):

| Composition | Example 1 | Example 2 |
| --- | --- | --- |
| Ground pork | 70.97% | 70.73% |
| Ground beef | 23.84% | 23.76% |
| White pepper | 0.179% | 0.178% |
| Peppercorns | 0.060% | 0.059% |
| Garlic powder | 0.015% | 0.015% |
| Dextrose | 0.953% | 0.950% |
| Salt | 2.574% | 2.566% |
| Prague Powder | 0.238% | 0.238% |
| Water | 0.5% | 0.5% |
| Encapsulated citric acid | 0.666% | 1.0% |

The first nine ingredients were combined and mixed thoroughly. The thirty-pound blend of ingredients was divided into two fifteen-pound batches, and the two different citric acid levels were added, followed by thorough mixing. The sausage blend was then stuffed into #3½ cellulose casings, tied and incubated at 80° F. for 24 hours. At timed intervals over the incubation period, samples were prepared for pH readings, which are presented in Table 1.

EXAMPLE 3

A seven-pound batch of sausage was prepared using a genoa-type salami formula with encapsulated citric acid. The citric acid coating was comprised of 40 wt. % hydrogenated palm oil and 60 wt. % DUR-EM TM 207E. The composition of the batch was as follows:

| Composition | wt. % |
| --- | --- |
| Ground pork | 70.97 |
| Ground beef | 23.84 |
| White pepper | 0.179 |
| Peppercorns | 0.060 |
| Garlic powder | 0.015 |
| Dextrose | 0.953 |
| Salt | 2.574 |
| Prague Powder | 0.238 |
| Water | 0.5 |
| Encapsulated citric acid | 0.666 |

The first nine ingredients were combined and mixed thoroughly. The encapsulated citric acid was added to the mixture and blended. The sausage blend was stuffed into #3½ cellulose casings, tied and incubated at 32° F. At timed intervals during incubation, samples were prepared for pH readings, which are presented in Table 1.

TABLE 1

Genoa Salami, Examples 1–3; pH Values at Timed Intervals During Incubation.

| Incubation Time (Hrs) | Incubation temperature and (wt. % Encapsulated Citric Acid) | | |
| --- | --- | --- | --- |
| | 32° F. (0.666%) Example 3 | 80° F. (0.666%) Example 1 | 80° F. (1.0%) Example 2 |
| (Before addition of citric acid) | 5.85 | — | — |
| 0 | 5.79 | 5.70 | 5.48 |
| 2 | 5.04 | 5.24 | 5.00 |
| 4 | — | 5.04 | 4.77 |
| 5 | 4.70 | — | — |
| 6 | 4.70 | — | — |
| 16 | — | 4.66 | 4.38 |
| 18 | — | 4.55 | 4.33 |
| 22 | 4.74 | 4.59 | 4.54 |
| 24 | 4.80 | 4.60 | 4.40 |
| 48 | 4.66 | — | — |
| 48 (after heating) | 4.63 | — | — |

Although the present invention has been described in terms of a number of specific examples and embodiments thereof, it will be appreciated by those skilled in the art that a wide variety of equivalents may be substituted for the specific compounds and steps of operation described herein, all without departing from the spirit and scope of the present invention, as defined in the appended claims.

We claim:

1. An acidulant for lowering the pH of a moist comminuted meat product, the meat product having an initial pH of about 6 and which is to be processed at a maximum processing temperature below about 135° F. to a pH level below about 5.2 in not less than one hour after adding the acidulant to the meat product, the acidulant having a delayed release coating encapsulating the acidulant, about 50 to 70 wt. % of the coating consisting of at least one water soluble glyceride, said water soluble glyceride having a melting point above said maximum processing temperature, and about 30 to 50 wt. % of the coating consisting of at least one hydrogenated vegetable oil, said hydrogenated vegetable oil having a melting point above said maximum processing temperature.

2. The acidulant of claim 1, wherein the water soluble glyceride is selected from the group consisting of oxidatively stable, film-forming, oxygen and moisture impervious, water soluble monoglycerides, diglycerides and mixtures thereof.

3. The acidulant of claim 1, wherein the hydrogenated vegetable oil is selected from the group consisting of hydrogenated palm oil, hydrogenated cottonseed oil, hydrogenated soybean oil, hydrogenated corn oil, hydrogenated peanut oil, hydrogenated palm kernel oil, hydrogenated babassu oil, hydrogenated sunflower oil, hydrogenated safflower oil and mixtures thereof.

4. The acidulant of claim 1, wherein the hydrogenated vegetable oil comprises hydrogenated palm oil.

5. The acidulant of claim 1, wherein the coating comprises about 60 wt. % of the water soluble glyceride and about 40 wt. % of the hydrogenated vegetable oil.

6. The acidulant of claim 5, wherein the hydrogenated vegetable oil comprises hydrogenated palm oil.

7. The acidulant of claim 5, wherein the water soluble glyceride comprises a mixture of mono- and diglycerides containing at least 50% monoglycerides, having a maximum IV value of 5 and a capillary melting point in the range of 140°-146° F.

8. The acidulant of claim 1, wherein the acidulant comprises a liquid acid and an acid carrier.

9. The acidulant of claim 8, wherein the acid comprises lactic acid and the carrier is selected from the group consisting of calcium lactate and microcrystalline cellulose.

10. The acidulant of claim 1, wherein the acidulant comprises a material selected from the group consisting of citric acid, ascorbic acid, tartaric acid, fumaric acid, adipic acid, lactic acid and glucono delta lactone.

11. A moist comminuted meat product containing the acidulant of claim 1.

12. The moist comminuted meat product of claim 11, wherein the meat product is selected from the group consisting of winter sausage, summer sausage, pepperoni, Lebanon bologna, pork roll, cervelats, frankfurters, bologna, salami, chopped meatloaf and potted comminuted meats.

13. A coated acidulant for acidulating a moist comminuted meat product, the acidulant having a delayed release coating containing 30 to 50 wt.% of that least one hydrogenated vegetable oil and 50 to 70 wt. % of at least one water soluble glyceride, which is soluble by water contained in the meat product, the water soluble glyceride being effective to delay releasing the acidulant into the meat product for a period of at least one hour after the acidulant is added to the meat product while the meat product is maintained at a temperature within the range of about 32° to below 135° F.

14. The moist comminuted meat product containing the acidulant of claim 13.

* * * * *